Aug. 21, 1956 J. S. HARRIS 2,760,122

COMMUNICATION EQUIPMENT

Filed June 1, 1953

INVENTOR.
JAMES S. HARRIS

BY H. W. Newton

ATTORNEY

United States Patent Office 2,760,122
Patented Aug. 21, 1956

2,760,122

COMMUNICATION EQUIPMENT

James S. Harris, Old Greenwich, Conn., assignor to Radio Corporation of America, a corporation of Delaware Application June 1, 1953, Serial No. 358,922

8 Claims. (Cl. 317—101)

Figure 1:
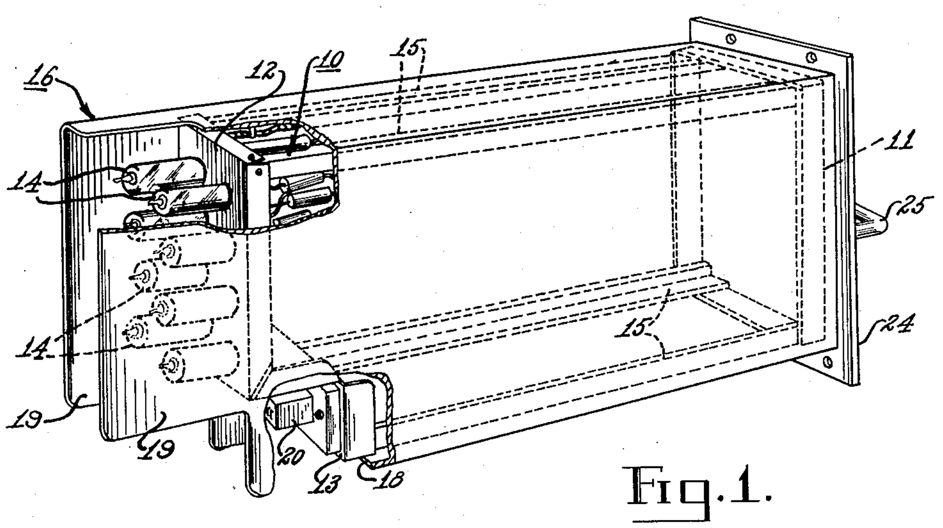

This invention relates to rack assembly electronic equipment and particularly to chassis structures useful in such equipment.

Designing electronic equipment so that various units are physically segregated according to functional characteristics has become common practice in many types of electronic systems. Such design has made it possible to remove certain units or subassemblies for repair without the necessity of disturbing other units in the system.

This has resulted in the extensive use of rack assemblies which permit various units to be mounted on a single frame. More than one such rack assembly is often used in a single system.

A convenient way of electrically interconnecting the various units within the rack assembly, or electrically interconnecting the units within a particular assembly with units in other assemblies within a system, is by means of electrical conductors in the form of cables. These cables usually terminate in plug-in connectors adapted to be connected to sockets or connectors attached to the units. The sockets or connectors, in turn, are connected to various electrical circuits within the unit.

In the design of such equipment involving plug-in connections in rack asemblies, it is often desirable to make such equipment as compact as practical. Very often proper ventilation of the tubes is difficult to attain in such asemblies.

Accordingly, it is an object of this invention to provide an improved plug-in chassis structure for rack-mounted electronic equipment in which ventilating of the tubes is facilitated.

Another factor to be considered in the design of such equipment is the fact that the various units within the assembly are frequently removed for repair or replacement. Such removal often results in mechanical damage to exposed tubes or other electrical parts.

It is therefore a further object of this invention to provide an improved rack-mounted chassis structure that protects from mechanical injury the electronic tubes therein when the chassis structure is removed from the rack assembly for maintenance or repair.

It is a further object of this invention to provide a plug-in chassis structure for electrical equipment of the type referred to in which good dissipation of heat from current carrying components, such as resistors, dry type rectifier element and other such components, as well as electronic tubes, is readily obtained in operation.

This invention provides a chassis or chassis structure which is designed to have external circuit connection plugs or receptacle elements as the case may be, recessed with respect to rearwardly extending portions or side plates of the chassis structure. Electronic tubes forming part of the chassis equipment are mounted on the rear plate or other rear outer surface of the structure. When the plug-in connectors are in place, the chassis rear plate is arranged to protrude past the plug-in connectors. This arrangement prevents the plug-in connectors from interfering with the free movement of convection currents in the air in the vicinity of the tubes. Such an arrangement also helps to prevent mechanical damage to the tubes when the chassis is removed for repair.

The advantages of the invention may be seen from the following detailed description, when read in conjunction with the accompanying drawings, and the novel features thereof as defined in the appended claims.

Figure 2:
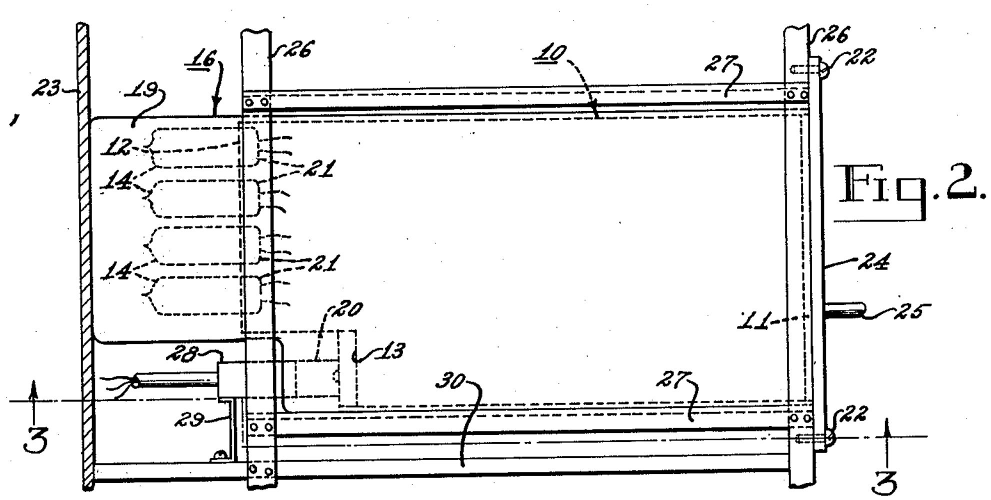
Figure 3:
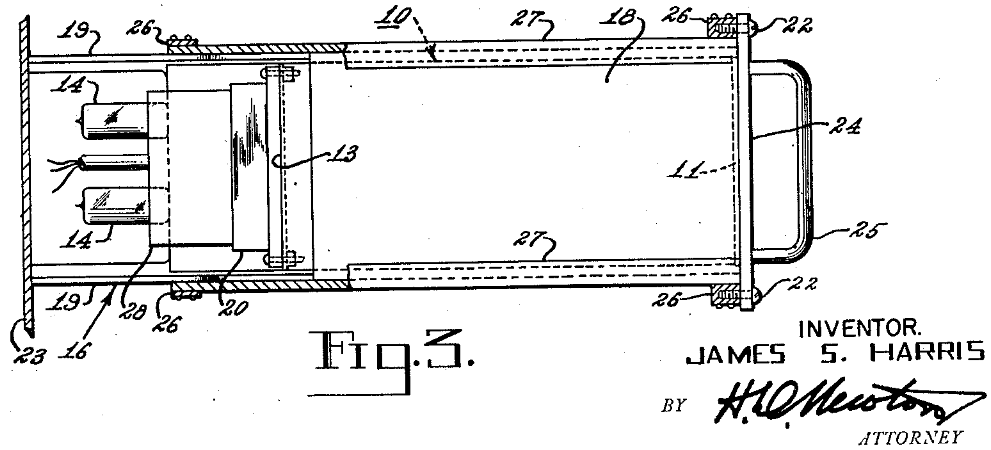

In the drawing:

Figure 1 is a view in perspective, and from the side and rear, partly broken away to show internal features, of a chassis structure for rack mounted electronic equipment embodying the invention; and Figures 2 and 3 are side and bottom views respectively, of the rack mounted chassis structure of Figure 1, showing further details of construction in accordance with the invention, Figure 3 being taken on the line of Figure 2 looking in the direction of the arrows.

Referring to the drawing, wherein like parts in the various figures are designated by like reference numerals, and with reference to Figure 1 in particular, a frame 10 has a front plate 11 adapted to receive electrical parts such as controls and switches (not shown). A stepped rear plate comprises two longitudinally spaced surfaces 12 and 13. The spaced surface 13 is recessed with respect to the surface 12. The more rearwardly disposed surface 12 is provided with socket means 21 (Figure 2) for mounting a plurality of electronic tubes 14 horizontally in place. The more forwardly disposed surface 13 is provided with means, such as the plug-in connector 20 for establishing electrical connections between the electrical circuits within the chassis structure and electrical circuits outside the chassis structure. Four angle bars 15 connect the front plate 11 with the stepped rear plate 12—13.

Enclosing the frame 10 is a cover or shield casing 16, preferably made of a metallic material. This cover or shield casing comprises a top wall portion 17 and a bottom wall portion 18 extending from the front plate 11 of the frame 10 to the stepped rear plate surfaces 12 and 13, respectively. The side wall portions 19 extend from the front plate 10 rearwardly beyond the stepped surface 12 and 13 or the rear plate. A portion of each side wall extending rearwardly beyond the rear plate surfaces 12 and 13 are reduced in width. A front panel 24 is suitably attached to the front portion of the four walls 17, 18 and 19.

Referring more particularly to Figures 2 and 3 of the drawing, the chassis structure is shown mounted in a rack assembly. Only a portion of the rack assembly is shown and comprises a rear panel or back wall 23 and a botton plate or floor member 30. A frame for the rack comprises rib members 26 and 27. The lower rib members comprise L-shaped bars the lower flanges of which support the chassis structure, when it is positioned within the rack. The L-shaped bars are suitably spaced to permit easy removal and replacement of the chassis structure and in effect provide "tracks" for the chassis structure. The front panel is attached to the rack frame ribs 26 by means of the screws 22. The chassis structure may be withdrawn from the rack assembly by removing the screws 22 and pulling the handle 25 outwardly. A plug-in cable connection 28 is mounted on a bracket 29 attached to floor member 30.

Referring further to Figures 2 and 3, the two side walls 19 engage and bear against the rear panel or wall 23 of the rack assembly as shown creating a heat conveying duct. This arrangement permits the heat dissipated by the electronic tubes to rise. Since the plug-in connectors are in the recessed portion of the rear plate, an unobstructed path for circulating air is provided. The cut out portions of side plates further aid in providing free circulation of cooling air in the form of convection currents induced by the construction of the duct means and the location of the tubes thereon. The ventilating duct means created by the arrangement described greatly facilitates the cooling of electronic tubes or other devices used in the rack without appreciably adding to the cost of construction.

A second feature of this invention is also illustrated in Figures 2 and 3. When the chassis is removed it may be seen that extended portions of the side walls 19 serve as protective members to prevent mechanical damage to the tubes, such as might result from their position.

Although only one embodiment has been described it is apparent that several modifications may be made without departing from the spirit of the invention. For example, the chassis cover or case shielding may be made as a single unit or in separate parts. In certain types of equipment it may be desirable to provide protection and cooling duct means for the tubes as a unit, in accordance with the invention, by attaching side plates extending to the rear in a rack mount, instead of being integral with the sides of the chassis. This is particularly true in the case of open chassis structures.

In certain types of equipment, units within a rack assembly may be stacked one upon another. In such arrangements, a continuous chimney effect may be desirable. If this is the case cut out portions in certain of the side plate walls would not be required.

What is claimed is:

1. In a rack assembly, for electrical apparatus, having a rear panel, and means for holding a plurality of plug-in chassis units, a chassis unit comprising a frame slidably connected with and mounted in the rack assembly, two vertical wall members attached to said frame and extending into engagement with the rear panel of the rack assembly, and electronic tube mounting means for said unit for mounting electron tubes in a rearwardly extending direction from said unit in a group between said wall members to provide convection cooling thereof.

2. A plug-in electronic tube unit comprising an elongated chassis structure having a stepped rear end to provide two longitudinally spaced vertical surfaces, means for mounting a plurality of electronic tubes in spaced substantially parallel relation on the more rearwardly disposed of said surfaces, means for establishing electrical connection with said apparatus carried by the more forwardly extending of said surfaces, electrical circuit elements carried by and within said structure, and means providing a shield casing for said structure having top and bottom wall portions terminating adjacent said vertical surfaces and side wall portions extending rearwardly beyond said surfaces a predetermined distance sufficient to extend beyond and protect electron tubes carried by said first named means and to direct and induce convection air currents therebetween resulting from heat created by said electron tubes.

3. A plug-in electronic tube unit as defined in claim 2, wherein a portion of each side wall extending rearwardly beyond said surfaces is reduced in width at the lower side thereof to provide for and enhance the air flow between said side walls.

4. In a rack assembly with a rear panel, a self cooling plug-in chassis for electrical apparatus having a chassis frame, a stepped rear plate for said frame member having two longitudinally spaced surfaces, means on the more rearwardly spaced surface to receive electrical parts including electronic tubes, means on the more forwardly spaced surface to receive connector means whereby electrical circuits in said plug-in chassis may be connected to electrical circuits outside said plug-in chassis, a front plate member for said frame, said front plate member being substantially parallel with said rear plate member, four substantially parallel frame members connecting said front plate with said rear plate, and cover means for said frame including two side walls extending along the exterior of said frame from said front plate member to said stepped rear plate member and having portions extending beyond said rear plate to the rear panel of said rack assembly to form an enclosure for electrical parts mounted in said first named means, said cover further including a top wall extending along the exterior of said frame from said front plate member to the more rearwardly spaced surface of said rear plate member, and a bottom wall extending along the exterior of said frame from said front plate member to the recessed portion of said rear plate member.

5. A plug-in chassis for electrical apparatus to permit ventilation of electrical parts, including electronic tubes, in a rack assembly having a rear panel, said plug-in chassis comprising a frame, means providing a rear plate for said frame, means for mounting electrical parts including electronic tubes on said rear plate, means providing two side walls extending along said frame beyond said rear plate to engage the rear panel of said rack assembly to form a protective enclosure for electron tubes mounted on said rear plate and to establish therewith air conduction means for cooling air currents about said electrical parts and protective means therefor when withdrawn from operative connection with said apparatus.

6. A chassis for a rack assembly comprising a frame and a cover, said frame comprising a rear plate means to receive electrical parts including electronic devices and having a recessed portion, said recessed portion being adapted to receive plug-in connectors, whereby the electrical circuits in the chassis may be connected to other electrical circuits, said cover comprising two wall members extending beyond the rear plate of said frame to the rear panel of the rack assembly, whereby the rear plate, the two wall members and the rear panel of the rack assembly provide a protective enclosure for electrical parts on said rear plate means and a duct arrangement for cooling the electrical parts by induced convection air currents or chimney effect.

7. A chassis assembly for electrical equipment comprising a frame member, a cover enclosing said frame member, a stepped rear plate for said frame member having two longitudinally spaced vertical surfaces, means for longitudinally mounting electron tubes on the more rearwardly of said vertical surfaces, and two vertical side walls extending beyond said rear plate a distance sufficient to provide a tube enclosure having open top and bottom areas for the creation of air currents in response to heating of apparatus in said enclosure.

8. A unitary plug-in electronic apparatus comprising a chassis for supporting electrical apparatus; means providing a rear plate for said chassis having a recessed portion; electronic tube mounting means in said rear plate; cover means for said chassis having a top wall extending along said chassis to said rear plate, and a bottom wall extending along said chassis to said recessed portion of said rear plate, and having two side walls extending along said chassis to said rear plate, and means providing rearwardly extending portions for said side walls extending beyond said rear plate to form a protective enclosure for electron tubes mounted in said electronic tube mounting means.

References Cited in the file of this patent

UNITED STATES PATENTS

| | | |
|---|---|---|
| 2,488,372 | Briesch | Nov. 15, 1949 |
| 2,514,246 | Knox | July 4, 1950 |
| 2,609,268 | Nye | Sept. 2, 1952 |